United States Patent
Peppas

(10) Patent No.: US 9,891,242 B2
(45) Date of Patent: Feb. 13, 2018

(54) FLOATING DUAL ANEMOMETER—MAST AND DOPPLER

(71) Applicant: Antonios Peppas, Athens (GR)

(72) Inventor: Antonios Peppas, Athens (GR)

(73) Assignee: Antonios Peppas (GR)

( * ) Notice: Subject to any disclaimer, the term of this patent is extended or adjusted under 35 U.S.C. 154(b) by 163 days.

(21) Appl. No.: 14/772,014

(22) PCT Filed: Mar. 7, 2014

(86) PCT No.: PCT/GR2014/000015
§ 371 (c)(1),
(2) Date: Sep. 1, 2015

(87) PCT Pub. No.: WO2014/140653
PCT Pub. Date: Sep. 18, 2014

(65) Prior Publication Data
US 2016/0018434 A1    Jan. 21, 2016

(30) Foreign Application Priority Data
Mar. 12, 2013    (GR) .................................. 130100146

(51) Int. Cl.
*B63B 22/18*    (2006.01)
*B63B 39/00*    (2006.01)
(Continued)

(52) U.S. Cl.
CPC ............... *G01P 5/02* (2013.01); *B63B 22/18* (2013.01); *B63B 39/00* (2013.01); *G01P 5/241* (2013.01);
(Continued)

(58) Field of Classification Search
CPC .......... F03D 13/25; B63B 39/00; B63B 22/18
See application file for complete search history.

(56) References Cited

U.S. PATENT DOCUMENTS

| 3,090,976 A | 5/1963 | Liu |
| 3,381,529 A | 5/1968 | Martin et al. |
| (Continued) | | |

FOREIGN PATENT DOCUMENTS

| CN | 101965454 A | 2/2011 |
| CN | 102762795 A | 10/2012 |
| (Continued) | | |

OTHER PUBLICATIONS

Corresponding Chinese Office Action dated Apr. 5, 2017.

*Primary Examiner* — Daniel J Colilla
(74) *Attorney, Agent, or Firm* — Berenato & White, LLC

(57) ABSTRACT

A device of a dual floating anemometer comprised of a mast, support arms for instruments, purlins, a central buoy, connecting beams, the edge floaters, the buoy hoop, the buoy—anchorage connector, anchorage hoop, anchorage, wind measuring instruments A, the connector beam of the anemometer base B, the wind instrument base B wind measuring instruments B, the anchorages of the edge floaters, the connections of the anchorages of the edge floaters with the edge floaters and the connector hoops of the anchorages with the edge floaters, which can be placed in shallow or big water depths and can simultaneously measure the characteristic wind parameters using both common anemometers and Doppler anemometers, so that the measurements of the wind potential (velocity, direction, turbulence) are extended to a higher altitude than the altitude of the mast which bears the cup anemometers, because of the combinatorial action.

5 Claims, 1 Drawing Sheet

(51) Int. Cl.
*G01P 5/02* (2006.01)
*G01P 5/26* (2006.01)
*G01P 5/24* (2006.01)
*G01S 17/02* (2006.01)
*G01S 17/58* (2006.01)
*G01S 15/88* (2006.01)
*G01S 17/95* (2006.01)

(52) U.S. Cl.
CPC .............. *G01P 5/26* (2013.01); *G01S 17/023* (2013.01); *G01S 17/58* (2013.01); *G01S 17/95* (2013.01); *G01S 15/885* (2013.01)

(56) References Cited

U.S. PATENT DOCUMENTS

| | | | |
|---|---|---|---|
| 3,336,799 A | 4/1976 | Kermode | |
| 4,155,673 A | 5/1979 | Yashima | |
| 5,297,632 A | 3/1994 | Blandford | |
| 2006/0062676 A1* | 3/2006 | Jakubowski | B63B 35/44 416/244 R |
| 2006/0179934 A1 | 8/2006 | Smith et al. | |
| 2011/0107953 A1* | 5/2011 | Jahnig | B63B 35/44 114/264 |
| 2011/0192333 A1 | 8/2011 | Lilas et al. | |
| 2012/0282034 A1 | 11/2012 | del Campo y Ruiz de Almodovar | |
| 2013/0228010 A1* | 9/2013 | Bertolotti | G01S 15/885 73/170.16 |

FOREIGN PATENT DOCUMENTS

| | | | | |
|---|---|---|---|---|
| DE | 2421917 A1 | 5/1975 | | |
| EP | 1174336 A1 | 1/2002 | | |
| EP | EP 1876093 A1 * | 1/2008 | ............ | B63B 21/29 |
| GB | 191406524 A | 6/1915 | | |
| GB | 1179903 A | 2/1970 | | |
| JP | 2002340924 A | 11/2002 | | |
| WO | WO2009064737 | 5/2009 | | |
| WO | WO2009064737 A1 | 5/2009 | | |
| WO | WO 2011057940 A2 * | 5/2011 | ............ | B63B 1/048 |
| WO | WO2012065876 | 5/2012 | | |

* cited by examiner

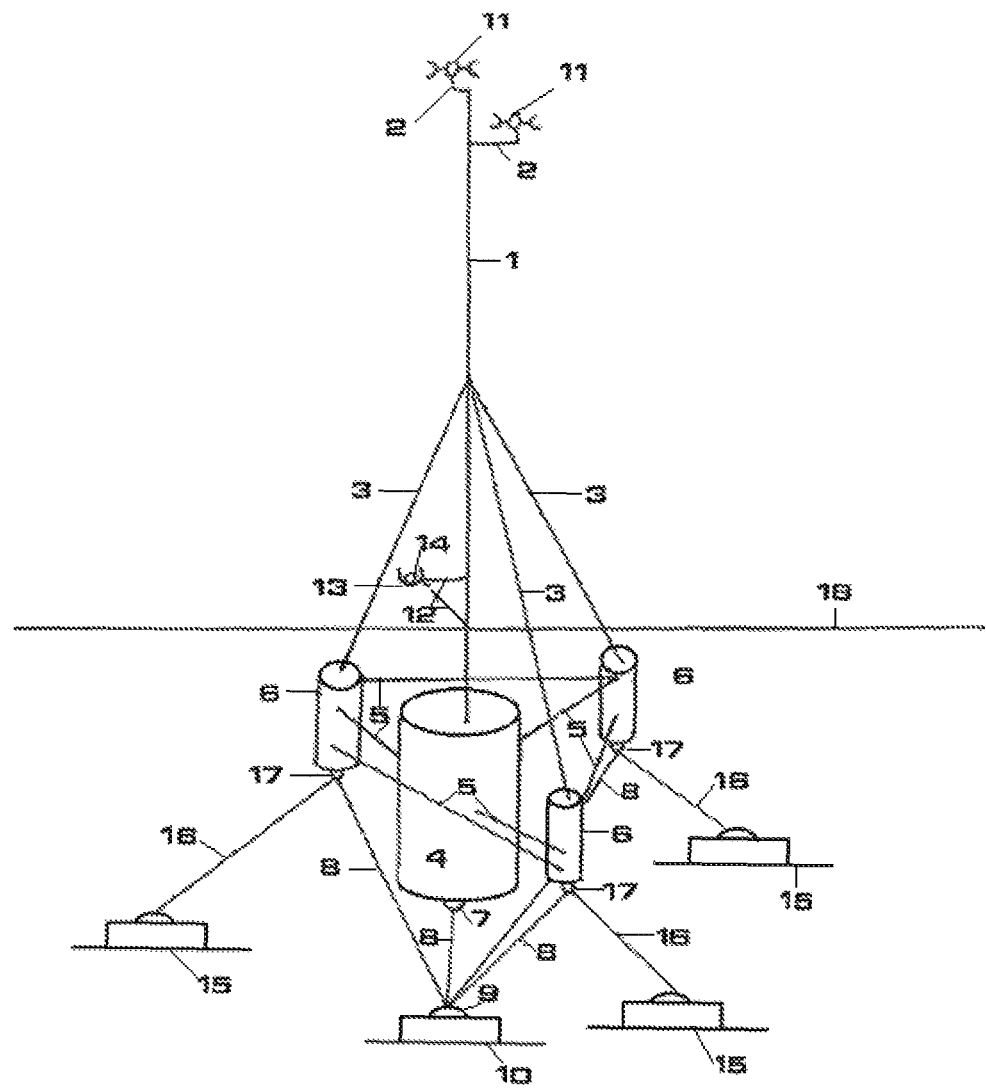

FLOATING DUAL ANEMOMETER—MAST AND DOPPLER

CROSS-REFERENCE TO RELATED APPLICATIONS AND CLAIM TO PRIORITY

This application is a national stage application of International Application No. PCT/GR2014/000015 filed Mar. 7, 2014, which claims priority to Greek Patent Application No. 20130100146 filed Mar. 12, 2013, the disclosures of which are incorporated herein by reference and to which priority is claimed.

FIELD OF THE INVENTION

The invention refers to a floating meteorological station suitable for wind measurements at significant reference heights in the open sea, by simultaneous application of conventional mast anemometer (cup anemometer) and Doppler anemometer.

BACKGROUND OF THE INVENTION

Devices which measure data of the wind, such as velocity and direction, and are placed on fixed or rotating bases on land or anchored to the bottom of the sea are known. These devices are not able to measure the velocity of the wind in the case that their base is moving or oscillating the way floating bases do. There are also floating devices for the measuring mainly of meteorological variables mounted on devices for the measuring of the waving. These devices do not measure the data of the wind at an altitude over 5 to 10 m from sea level and do not provide wind measurement data adequate for wind resource assessment of Offshore Wind Parks.

The device according to the present invention remedies this serious drawback by providing bankable wind data.

SUMMARY OF THE INVENTION

The advantage of the present invention is its ability to measure the velocity of the wind at high altitudes from the sea level in areas of shallow water and also in areas having a big depth from the average sea level. In this way, useful wind data concerning the dimensioning and the wind potential of floating wind generators can be acquired.

Furthermore, the combination of mast and Doppler technology, (e.g. LiDAR) provides the possibility of correlation between LiDAR and mast anemometer data. The construction buoyancy provides excellent stability and optimal reliability for the wind measuring due to minimizing the angular velocity of the mast (1) and of the instrument base B (13) which bears the instruments. The decrease of the angular velocities is very important, because the data from the anemometers do not need to be corrected, or the correction is minimal. Under normal operating conditions, the angular moves of the construction regarding the vertical axis are minimal; this makes the measuring corrections of the Doppler instruments unnecessary.

BRIEF DESCRIPTION OF THE DRAWINGS

A better understanding of the invention will be had with reference to the accompanying drawing wherein:

FIG. 1 is a perspective view of a floating anemometer according to the invention.

DETAILED DESCRIPTION OF THE PREFERRED EMOBIDMENT(S)

The floating anemometer according to attached FIG. 1 comprises: a mast (1), support arms (2) for cup anemometers (11), purlins (3), a central floater (4), connecting beams (5), edge floaters (6), a buoy hoop (7) for the central floater (4) and a buoy hoop (17) for each of the edge floaters (6), a buoy—anchorage connector (8), an anchorage hoop (9), an anchorage (10) for the central floater (4), wind measuring instruments A (11), the connector beam (12) of the anemometer base B, the wind instrument base B (13), the wind measuring instruments B (14), the anchorages (15) of the edge floaters (6), and anchorage connectors (16) connecting the anchorages (15) to the edge floaters (6). The FIGURE shows the edge floaters (6) at the same height as the central floater (4).

The wind measuring instruments (11) are attached to the support arms (2), which in turn are attached to the mast (1). The mast (1) bears the loads (measurings instruments and own weight) and transfers them to its support base (4), as well as through the purlins (3) to the edge floaters (6). The purlins (3) are mounted on the edge floaters (6) and operate as a resistance to the bending forces of the mast (1) resulting in a lighter construction of the mast (1). The floaters, both the central (4) as well as the edge floaters (6) are connected to each other by the beams (5) and operate as an integrated floating construction, which repositions the mast to the upright position. These connecting beams (5) are equal in number to the edge floaters and each of them can either be independent or have purlins mounted to the central floater (4). The floaters (central and edge floaters) are completely immersed and lighter than the water to exert a buoyancy force to the whole construction. The balancing of the construction is achieved by the restoring torque, because of the buoyancy of the edge floaters (6). Thus the construction returns faster to the vertical axis (original situation), which results in a limited movement of the anemometer and a better measuring. The rotational movement is limited by the anchorage of the edge floaters. The immersed part of the construction is in a level, where it remains unaffected by the waves on the sea surface (18).

The combination of the geometrical data of: the floaters (4) & (6), the mast (1), the purlins (3), the beams (5), the anchorage (10) and (15), the connections of floaters—anchorages (9 and 17), the freeboard constructions, and the construction materials and their weights determines the normal frequency of the floating construction. This normal frequency may vary depending on the design in the location of mounting the device, i.e. the characteristics of the waves and of the wind. The edge floaters (6) can be three or more according to the floating construction's needs.

The central buoy (4) has on its lower part a buoy hoop (7) and the edge floaters (6) have on their lower part a buoy hoop (17). The buoy anchorage-connector (8) is tied to the buoy hoop (7). The buoy anchorage-connector (8) may consist entirely or partly of a chain, a rope, a wire rope or any other suitable material and can be single or double for greater safety. This connection essentially connects the floating construction with an anchorage hoop (9) and finally with an anchorage (10) which on one hand prevents the moving of the floating construction beyond a certain limit, and on the other hand counterbalances the buoyancy forces of the construction. This anchorage lies at the bottom of the sea. The remaining anchors (15) are connected in the same manner via anchorage connectors (16) with the edge floaters (6) and prevent the construction from rotating around a vertical axis.

The parts (1), (2), (3) and (5), (12) and (13) can be made of metal (e.g. steel, aluminum) or synthetic materials (plastic, carbon fibers). The parts of the floaters (4) and (6) can be made of metal, synthetic materials, concrete or any other suitable material, either hollow or solid. To assure their floating ability, they can be filled with light materials such as wood, expanded polyurethane, cork, expanded polystyrene, etc. The parts (7), (9) and (17) are made of metal, the parts (8) and (16) can be made of different appropriate materials either entirely or partly and the parts (10) and (15) can be made of any other suitable material (concrete, metal, etc.).

The measuring instruments A, see (11) FIG. 1, can be of any suitable form and are using any suitable technology for measuring the velocity and the direction of the wind; the measuring instruments B, see (14) FIG. 1, can be measuring instruments for the velocity and the direction of the wind which are using Doppler technology (LiDAR or SODAR) and measuring instruments for the solar radiation, for the humidity, for the temperature, photovoltaic cells, measuring instruments for the level, devices for the transmission of information, as well as any other suitable measuring instrument.

This device enables the measurement of wind data, such as wind force and wind direction at a high altitude from the level of the sea and at great depths. The placement of other meteorological instruments is also possible, either on the central floater or on the mast, or on the support arms for instruments or on the base of the measuring instruments B. This device provides excellent stability under extreme weather and sea conditions and provides simultaneous use of conventional wind measuring technology, like cup anemometer and remote sensing technology such as LiDAR and SODAR. This enables the calibration and the correlation between different wind measuring instruments. The floating dual anemometer can also operate as a mast anemometer or as a Doppler measuring instrument without a mast.

The invention claimed is:

1. A floating meteorological station, comprising:
    an anemometer device comprising a vertically oriented mast (1), support arms (2) connecting said mast (1) to cup anemometers (11), and a beam structure (12) connecting said mast (1) to a support base (13) of a LIDAR or SODAR wind measuring instrument (14);
    a fully immersed buoyant structure, comprising
        a central floater (4) with said mast (1) mounted thereon;
        a plurality of edge floaters (6);
        a plurality of beams (5) connecting each one of said edge floaters (6) to said central floater (4);
        a central buoy hoop (7) provided at the bottom of said central floater (4); and
        edge buoy hoops (17) each provided at the bottom of a respective one of said edge floaters (6),
        said edge floaters (6) being adapted to provide a restoring torque that acts to maintain a vertical orientation of said mast (1) through minimizing angular displacement thereof;
    purlins (3) connecting said mast (1) with said edge floaters (6), said purlins (3) being adapted to resist bending forces of the mast (1); and
    an anchorage structure for said fully immersed buoyant structure, comprising
        a central anchorage (10) for said central floater (4);
        edge anchorages (15) each for a respective one of said edge floaters (6);
        anchorage hoops (9) respectively provided for said central anchorage (10) and for said edge anchorages (15);
        central anchorage connectors (8) respectively provided to connect said central buoy hoop (7) at the bottom of said central floater (4) and said edge buoy hoops (17) of said edge floaters (6) with said anchorage hoop (9) of said central anchorage (10); and
        edge anchorage connectors (16) respectively provided to connect a respective one of said edge buoy hoops (17) at the bottom of said edge floaters (6) with a respective one of said anchorage hoops (9) of said edge anchorages (15),
    wherein said central anchorage (10) is adapted to prevent movement of said fully immersed buoyant structure beyond a certain limit and to counterbalance the buoyancy forces thereof;
    wherein said edge anchorages (15) are adapted to prevent rotation of said fully immersed buoyant structure around a vertical axis; and
    wherein the floating meteorological station is adapted to provide wind measurements at significant reference heights exceeding the altitude of said mast (1) in an open sea through simultaneous wind measurements of said cup anemometers (11) mounted proximally to the top of said mast (1) and of said LIDAR or SODAR wind measuring instrument (14) mounted proximally to the bottom of said mast (I) close to a sea surface of the open sea (18).

2. A floating meteorological station according to claim 1, wherein a normal frequency of said floating meteorological station, variable in accordance with the characteristics of the waves and of the wind, is determined by the combination of:
    the geometrical data of: said central floater (4) and said edge floaters (6), of said mast (1), of said purlins (3), of said beams (5), of said anchorage (10) and said anchorages (15), of said anchorage hoops (9) and said buoy hoops (17);
    the freeboard constructions, and
    the construction materials and their weights.

3. A floating meteorological station according to claim 1, wherein the materials used in the construction of constituent parts thereof are selected as follows:
    said mast (1), said support arms (2) for cup anemometers (11), said beam structure (12), said support base (13) for a LIDAR or SODAR wind measuring instrument (14), and said purlins (3) are made from steel or aluminum or from synthetic materials including plastic or carbon fibers;
    said central floater (4) and said edge floaters (6) are made from metals or synthetic materials or concrete filled with light materials such as wood, expanded polyurethane, cork, or expanded polystyrene;
    said buoy hoops (7), (17) and said anchorage hoops (9) are made from metal;
    said anchorages (10) and (15) are made from concrete or metal;
    said anchorage connectors (8) and (16) are entirely or partly made from a chain, a rope, a wire rope or any other suitable material.

4. A floating meteorological station according to claim 1, wherein the floating meteorological station is adapted to measure the velocity of the wind at high altitudes from sea level in areas of shallow water and in areas having a big depth from the average sea level, thereby providing useful wind data concerning the dimensioning and the wind potential of offshore wind generators.

5. A floating meteorological station according to claim 1, wherein said edge anchorages (15) are located at the same height as said central anchorage (10).

* * * * *